United States Patent
Turgis et al.

(10) Patent No.: US 12,473,437 B2
(45) Date of Patent: Nov. 18, 2025

(54) FLUOROPOLYMER-BASED COATING COMPRISING A TEMPERATURE INDICATOR

(71) Applicant: SEB S.A., Ecully (FR)

(72) Inventors: Raphaël Turgis, Ecully (FR); Isabelle Joutang, Ecully (FR); Stephanie Le Bris, Ecully (FR); Anne Teissier, Ecully (FR)

(73) Assignee: SEB SA (FR)

( * ) Notice: Subject to any disclaimer, the term of this patent is extended or adjusted under 35 U.S.C. 154(b) by 0 days.

(21) Appl. No.: 17/925,891

(22) PCT Filed: May 18, 2021

(86) PCT No.: PCT/FR2021/050878
§ 371 (c)(1),
(2) Date: Nov. 17, 2022

(87) PCT Pub. No.: WO2021/234284
PCT Pub. Date: Nov. 25, 2021

(65) Prior Publication Data
US 2023/0183497 A1     Jun. 15, 2023

(30) Foreign Application Priority Data

May 19, 2020    (FR) .................................... 2005086

(51) Int. Cl.
*C09D 5/29*     (2006.01)
*A45D 1/28*     (2006.01)
(Continued)

(52) U.S. Cl.
CPC ................. *C09D 5/29* (2013.01); *A45D 1/28* (2013.01); *A45D 2/001* (2013.01); *A47J 36/02* (2013.01);
(Continued)

(58) Field of Classification Search
None
See application file for complete search history.

(56) References Cited

U.S. PATENT DOCUMENTS

| 6,551,693 B1 | 4/2003 | Buffard et al. |
| 9,758,681 B2 | 9/2017 | Le Bris et al. |

(Continued)

FOREIGN PATENT DOCUMENTS

| CN | 102370432 A | 3/2012 |
| EP | 1121576 B1 | 5/2008 |

(Continued)

OTHER PUBLICATIONS

Machine Translation of WO 2020/235844A1 via EPO (Year: 2020).*
International Search Report for PCT /FR2021/050878 mailed Sep. 13, 2021. 4 pgs.

*Primary Examiner* — Laura C Powers
(74) *Attorney, Agent, or Firm* — Lerner David LLP (57) ABSTRACT

The present invention relates to a fluoropolymer-based coating of the surface of a household article comprising at least two decorations (a) and (b) arranged between or in its layers, wherein: (a) is a decoration comprising at least one thermochromic pigment composition in the form of particles consisting of a (Bi1-xAx) (V1-yMy)O4 type pigment, where: —x is 0 or x is from 0.001 to 0.999; —y is equal to 0 or y is from 0.001 to 0.999; —A and M are selected from the group consisting of nitrogen, phosphorus, an alkali metal, an alkaline earth metal, a transition metal, a poor metal, a metalloid or a lanthanide; —A and M are different from each other; and (b) is a decoration comprising a temperature reference pigment composition.

16 Claims, 5 Drawing Sheets

(51) Int. Cl.
- *A45D 2/00* (2006.01)
- *A47J 36/02* (2006.01)
- *C09D 5/00* (2006.01)
- *C09D 5/26* (2006.01)
- *C09D 7/61* (2018.01)
- *C09D 11/037* (2014.01)
- *C09D 11/106* (2014.01)
- *C09D 11/50* (2014.01)
- *C09D 127/18* (2006.01)
- *D06F 75/38* (2006.01)
- *G01K 11/14* (2006.01)

(52) U.S. Cl.
CPC ............... *C09D 5/002* (2013.01); *C09D 5/26* (2013.01); *C09D 7/61* (2018.01); *C09D 11/037* (2013.01); *C09D 11/106* (2013.01); *C09D 11/50* (2013.01); *C09D 127/18* (2013.01); *D06F 75/38* (2013.01); *G01K 11/14* (2013.01); *A47J 2202/00* (2013.01)

(56) References Cited

U.S. PATENT DOCUMENTS

| | | |
|---|---|---|
| 10,752,783 B2 | 8/2020 | Gantillon |
| 2012/0052265 A1 | 3/2012 | Le Bris et al. |
| 2013/0010827 A1 | 1/2013 | Pimia |
| 2019/0099780 A1 | 4/2019 | Caillier et al. |
| 2020/0283646 A1 | 9/2020 | Le Bris et al. |

FOREIGN PATENT DOCUMENTS

| | | | |
|---|---|---|---|
| FR | 1388029 A | 2/1965 | |
| FR | 3068981 A1 | 1/2019 | |
| JP | H11349332 A | 12/1999 | |
| JP | 2002527734 A | 8/2002 | |
| JP | 2011178638 A | 9/2011 | |
| JP | 2016216528 A | 12/2016 | |
| JP | 2017527652 A | 9/2017 | |
| JP | 2018524445 A | 8/2018 | |
| JP | 2019517907 A | 6/2019 | |
| WO | 2017153698 A1 | 9/2017 | |
| WO | WO-2020235844 A1 * | 11/2020 | ............ A47J 36/02 |

* cited by examiner

Fluoropolymer-Based Coating Comprising a Temperature Indicator

CROSS-REFERENCE TO RELATED APPLICATIONS

The present application is a national phase entry under 35 U.S.C. § 371 of International Application No. PCT/FR2021/050878, filed May 18, 2021, which claims priority from French Patent Application No. 2005086 filed May 19, 2020, all of which are incorporated herein by reference.

The present invention relates to a coating of the surface of a household article comprising a functional temperature indicator with improved visibility, preferably for cookware.

Figure 1:
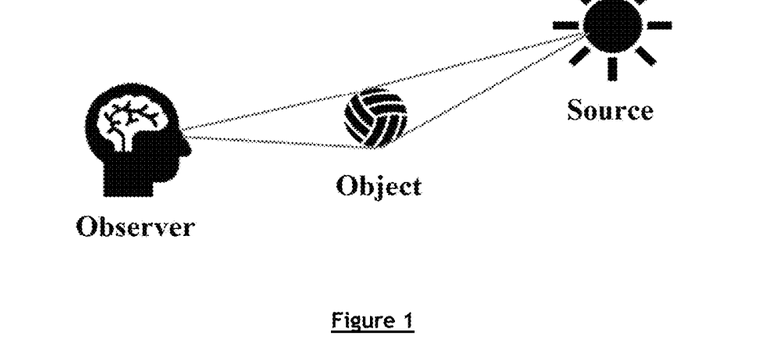
FIG. 1: The factors influencing colour

The colour of an object is not actually physical, in fact, it is the consequence of the simultaneous action of three factors: the luminous flux or the source (light), the observer (eye→vision) and the object. (FIG. 1)

Light is a wave, a particular characteristic of which is to propagate in vacuum and in transparent media. There are two types of light sources: primary sources which are sources which produce their own light (for example: sun, fire, lamp, TV, laser). Secondary sources, on the other hand, are objects which scatter the surrounding light: the light from a primary source.

The materials which receive the light such as textiles, papers, food products, coatings, can behave in different ways: they can allow the light to cross them, in which case they are transparent, or they can prevent the light from passing and they are thus opaque.

If the object is opaque, it may be white and, in this case, it completely reflects the luminous energy. In contrast, if it is black, it will completely absorb the luminous energy. When it is grey (darker or lighter), it reflects part of the radiation and absorbs the rest.

It is this selective absorption of radiations at certain wavelengths of the visible light spectrum which characterises the colour of the material. The rest of the radiation not absorbed by this material is thus reflected and therefore visible to the observer.

The visual perception of an object is therefore related to the light modified and transmitted by this object, light which is perceived by the eyes and finally interpreted by the brain. The eye is capable of discerning approximately 350,000 different colours.

In the eye, the cornea makes the image on the retina, the lens adjusts the focus and the iris acts as a filter by dilating or contracting the pupil. The receptor components are in the retina: the cones and the rods. The rods provide night vision, while the cones (blue, green and red) provide day vision and transform the light signal into a nerve signal.

In the household field, it is vital for the user of such articles to see the change in temperature of an article during use when it is subject to a heat source or when it heats up.

In the case of cookware, good temperature control during cooking of food is necessary for health and taste reasons (for example, to sear a steak on a grill or in a frying pan) as well as to limit occasional overheating from damaging the cookware coating. A less overheated material will have a longer service life. Food cooked at a lower temperature will have healthier organoleptic characteristics. Moreover, cooking performed at the right temperature makes it possible to limit energy input and therefore environmental impact.

In the case of a clothing iron or hair straightener, temperature control makes it possible to avoid adverse effects related to the use of such articles such as, for example, the effect of making hair brittle or degrading textile fibers as well as to avoid household accidents such as burns.

French patent FR 13 88029 is known, which describes a cooking utensil provided with a thermal indicator consisting of a thermosensitive component reversibly changing colour as a function of the temperature, this thermal indicator being formulated in a non-stick coating, especially consisting of polytetrafluoroethylene. A thermostable pigment (i.e., a mineral or organic compound, which does not show or shows very little colour change when it is subjected to an increased temperature in a given temperature range) can also be incorporated in the cooking utensil as a control to assess the change relative to the colour of the thermal indicator and therefore the temperature change. However, in this invention, the thermostable control is not integrated in the non-stick coating and therefore does not provide clear visibility of the relative change.

To remedy these problems, the Applicant then developed a thermal indicator based on thermochromic pigments described in the European patent EP 1 121 567. This thermal indicator is a decoration comprising at least two patterns, one based on an iron oxide thermochromic pigment darkening as the temperature increases, the other based on a thermochromic pigment very slightly lightening as the temperature increases comprising a mixture of perylene red and spinel black. It follows that at a pre-established temperature (which can be set from 160° C. to 220° C.) a confusion of the colours of the two patterns is obtained, which is a means of identifying this pre-established temperature.

The simultaneous use of these thermochromic pigments in contiguous areas of a decoration effectively makes it possible to improve the visual perception of a temperature change of the cooking surface of the cookware. However, this type of thermal indicator remains difficult to understand for the user at first glance because the two areas each have a red colour with a very close chromatic value at room temperature. Moreover, the confusion of the colours of the decoration patterns occurs in a zone of thermal amplitude of at least 50° C. It follows that it is not easy to assess the change in temperature and reading is not easy, in particular for a public without particular training. As a result, users have a tendency to ignore the information provided by this thermal indicator.

There is therefore an interest in being able to offer a thermal indicator which clearly changes colour and/or optical property during a temperature variation, for example, by exhibiting clearly different colours in the case of a coloured thermal indicator.

The advantage of the invention is to provide the consumer improved readability, understanding and perception.

SUMMARY OF THE INVENTION

A first subject-matter of the invention relates to a fluoropolymer-based coating of the surface of a household article comprising at least two decorations (a) and (b) arranged between or in the coats of said coating:
(a) a decoration comprising at least one thermochromic pigment composition in the form of particles consisting of a $(Bi_{1-x}A_x)(V_{1-y}M_y)O_4$ type pigment,
  x is equal to 0 or x is between 0.001 and 0.999,
  y is equal to 0 or y is between 0.001 and 0.999,
  A and M are chosen in the group consisting of nitrogen, phosphorus, an alkali metal, an alkaline earth metal, a transition metal, a poor metal, a metalloid or a lanthanide,
  A and M are different from one another, (b) a decoration comprising a temperature reference pigment composition.

Another subject-matter of the invention concerns a household article comprising a substrate completely or partially covered with a coating according to the invention.

Another subject-matter of the invention relates to a method of using a household article according to the invention, characterised by the following steps:

Heating said household article or putting it in the presence of an external heating source, Observing the colour change(s) of the $(Bi_{1-x}A_x)(V_{1-y}M_y)O_4$ type pigment and the temperature reference pigment composition, Using said household article when:
- the colours of the $(Bi_{1-x}A_x)(V_{1-y}M_y)O_4$ pigment and the temperature reference pigment composition are identical, or
- the colours of the $(Bi_{1-x}A_x)(V_{1-y}M_y)O_4$ pigment and the temperature reference pigment composition, respectively, reach the colours defined in the instructions for use of said household article.

Definitions

"Room temperature" is understood to mean a temperature between 18 and 30° C.

Within the meaning of the present invention, "coat" should be understood to mean a continuous or discontinuous coat. A continuous coat (also called a monolithic coat) is a single whole forming a total solid colour completely covering the surface on which it is put down. A discontinuous coat (or non-monolithic coat) can comprise several parts so is not a single whole.

"Primer coat", "bonding coat" or "bonding primer" is understood to mean all the coats from the first coat applied directly to the support, also called substrate, (it is preferable that this coat adheres well to the support and provides all its mechanical properties to the coating: hardness, scratch resistance) to the last coat before the first decorative coat.

"Finish coat" or "finish" is understood to mean a continuous and transparent surface coat leaving the decorative coat perfectly visible while protecting it from mechanical damage and conferring its non-stick properties to the coating.

"Decoration" or "decorative coat" is understood to mean several continuous or discontinuous coats comprising a pigment composition. The decoration can be in the form of one or more patterns and one or more colours. A decoration is distinctly visible to the user with the naked eye and at a standard distance of use of the household article.

"Overlapping coats" is understood to mean partially or completely superposed coats. These coats can be in the form of decoration with partially overlapping patterns, for example concentric disks.

"Adjacent coats" is understood to mean non-superposed coats. These coats can be present in the form of decoration with identical or different non-superposed patterns, preferably uniformly distributed.

"Temperature reference pigment composition" is understood to mean a composition comprising a pigment which, at a given temperature, makes it possible to indicate to the user that the optimal temperature is reached. This indication is made by comparing colours of the $(Bi_{1-x}A_x)(V_{1-y}M_y)O_4$ type pigment and the temperature reference pigment composition. Either the optimal usage temperature is reached when the colours are identical or the optimal usage temperature is reached when the colours are visually very different.

The "temperature reference pigment composition" can comprise a pigment that has:

The same colour as the $(Bi_{1-x}A_x)(V_{1-y}M_y)O_4$ type pigment, at the optimal usage temperature,
- either because this pigment has the same colour at room temperature as the $(Bi_{1-x}A_x)(V_{1-y}M_y)O_4$ type pigment at the optimal usage temperature, and does not change colour with the temperature,
- or because this pigment has a different colour at room temperature from that of the $(Bi_{1-x}A_x)(V_{1-y}M_y)O_4$ type pigment which changes to the same colour as the $(B_{1-x}A_x)(V_{1-y}M_y)O_4$ type pigment at the optimal usage temperature, a very different colour from this $(Bi_{1-x}A_x)(V_{1-y}M_y)O_4$ type pigment at the optimal usage temperature, whether or not this pigment changes colour with the temperature change.

The optimal usage temperature can be attained when the colour of the temperature reference pigment composition is a colour indicated in the user guide of the household article comprising the coating of the invention or a colour indicated on a colour scale provided to the user with said article.

The temperature reference pigment composition is thermochromic or thermostable.

For a household article which is not cookware, such as a hair straightener or a clothing iron, the temperature reference pigment composition can be, for example, a reference pigment composition of normal usage temperature or indication of a danger of burning.

For cookware, the temperature reference pigment composition can be, for example, a reference pigment composition of a cooking temperature or an indication of a risk of overheating.

The present invention has at least one of the following advantages:
- the coating according to the invention has a thermochromic functionality with a marked visibility, a contrasting colour change over a targeted, precise and centred temperature range, for example around food cooking temperatures for a kitchen appliance;
- the coating according to the invention can provide good temperature control, for example when cooking food, which is necessary for health and taste reasons as well as to limit occasional overheating from damaging the cookware coating;
- the $(Bi_{1-x}A_x)(V_{1-y}M_y)O_4$ type compound has a reversibility of its thermochromic properties, i.e., after a colour change under the effect of heat the compound returns to its initial state and its initial colour when the temperature decreases; this colour change cycle (reversibility) can be repeated infinitely with no loss of its properties.
- the coating according to the invention has a substantial thermal stability during temperature increases; it is stable up to approximately 450° C.

Within the meaning of the present invention, the expression "thermochromic semiconductor" should be understood to mean a mineral or organic compound, which exhibits a reversible colour change during an increase in temperature. The progressive and reversible thermochromic nature of these semiconductor compounds is related to the decrease in the width of the forbidden band of the semiconductor due to the expansion of the material. Indeed, the periodicity of the anion and cation network leads to the gathering of energy levels into energy bands. The filled energy band with higher energy is called valence band and the empty energy band with lower energy is called conduction band. Between these two bands, there is a forbidden band called gap. The colour of a semiconductor material can originate from the presence of a charge transfer which corresponds to the passage of an electron either from a valence band to a conduction band on the same atom, or, commonly, from the orbital of an anion to the orbital of a cation (interatomic photon absorption).

In the fields of application considered for the present invention, a household appliance of the clothing iron or hair straightener type is typically used in a temperature range from 100° C. to 300° C., preferably from 100 to 250° C., in a particularly preferred manner from 100 to 200° C.

In the fields of application considered for the present invention, in the case of a cookware, the optimal conditions are attained when the coating reaches a temperature suitable for cooking food, preferably comprised between 100 and 250° C.

Within the meaning of the present invention, "thermochromic pigment, thermochromic pigment compound or thermochromic pigment composition" should be understood to mean a pigment, a pigment compound or pigment composition which changes colour as a function of temperature in a given temperature range, this change being reversible. This colour change is visible to the user by the naked eye and at a standard distance for use.

"Thermostable pigment, thermostable pigment compound or thermostable pigment composition" is understood to mean a pigment, pigment compound or pigment composition which does not exhibit a colour change when it is subjected to a temperature increase in a given temperature range or which exhibits a change of hue when it is subjected to a temperature increase in a given temperature range so small that it is not visible to the user with the naked eye and at a standard distance for use.

Preferably, the thermostable pigments have a colour difference $\Delta E^*$ between 25° C. and 200° C. less than 10.

"In the form of particles consisting of a $(Bi_{1-x}A_x)(V_{1-y}M_y)O_4$ type pigment" means that the particles of the thermochromic pigment composition are purely composed of a $(Bi_{1-x}A_x)(V_{1-y}M_y)O_4$ type pigment. Therefore, they are not coated. Advantageously they are rough.

"The colours are identical" is understood to mean indistinguishable to user with the naked eye and at a standard distance for use.

The expression "household article" should be understood to mean cookware and household appliances.

The household appliances in question here are intended to produce heat.

Within the meaning of the present invention, "cookware" should be understood to mean an object intended for cooking. For this purpose, it is intended to receive a heat treatment.

Within the meaning of the present invention, "object intended to receive a heat treatment" should be understood to mean an object which will be heated by an external heating system such as frying pans, saucepans, sauté pans, woks or barbecue grills, and which is able to transmit the calorific energy provided by this external heating system to a material or food in contact with said object.

Within the meaning of the present invention, "object intended to produce heat" should be understood to mean an object having its own heating system such as clothing irons, hair straighteners, steam generators, kettles or electrical appliances for cooking.

"Fluoropolymer-based coating" is understood to mean a coating which comprises one or more fluoropolymers in one or more of its coats.

DETAILED DESCRIPTION OF THE INVENTION

A first subject-matter of the invention relates to a fluoropolymer-based coating of the surface of a household article comprising at least two decorations (a) and (b) arranged between or in the coats of said coating:
(a) a decoration comprising at least a thermochromic pigment composition in the form of particles consisting of a $(Bi_{1-x}A_x)(V_{1-y}M_y)O_4$ type pigment,
(b) a decoration comprising a temperature reference pigment composition
x is equal to 0 or x is between 0.001 and 0.999,
y is equal to 0 or y is between 0.001 and 0.999,
A and M are chosen in the group consisting of nitrogen, phosphorus, an alkali metal, an alkaline earth metal, a transition metal, a poor metal, a metalloid or a lanthanide,
A and M are different from one another.

Preferably, the amount of $(Bi_{1-x}A_x)(V_{1-y}M_y)O_4$ in the decoration (a) is comprised from 0.1 to 100% by weight relative to the weight of said coat in the dry state, preferably 0.2 to 80% by weight, more preferably 0.5 to 70% by weight.

Preferably, the amount of temperature reference pigment composition in the decoration (b) is comprised from 0.1 to 100% by weight relative to the weight of said coat in the dry state, preferably 0.2 to 80% by weight, more preferably 0.5 to 70% by weight.

Given that A and M are different from one another, when:
A is an alkali metal, it can be chosen from Li, Na, K, Rb and Cs,
M is an alkali metal, it can be chosen from Li, Na, K, Rb and Cs,
A is an alkaline-earth metal, it can be chosen from Be, Mg, Ca, Sr and Ba,
M is an alkaline-earth metal, it can be chosen from Be, Mg, Ca, Sr and Ba,
A is a transition metal, it can be chosen from Sc, Ti, Cr, Mn, Fe, Co, Ni, Cu, Y, Zr, Nb, Mo, Ru, Rh, Pd, Ag, Ta, W and Ir,
M is a transition metal, it can be chosen from Sc, Ti, Cr, Mn, Fe, Co, Ni, Cu, Y, Zr, Nb, Mo, Ru, Rh, Pd, Ag, Ta, W and Ir, A is a poor metal, it can be chosen from Al, Zn, Ga, In and Sn, M is a poor metal, it can be chosen from Al, Zn, Ga, In and Sn, A is a metalloid, it can be chosen from B, Si, Ge and Sb, M is a metalloid, it can be chosen from B, Si, Ge and Sb, A is a lanthanide, it can be chosen from La, Ce, Pr, Nd, Pm, Sm, Eu, Gd, Tb, Dy, Ho, Er, Tm, Yb and Lu, M is a lanthanide, it can be chosen from La, Ce, Pr, Nd, Pm, Sm, Eu, Gd, Tb, Dy, Ho, Er, Tm, Yb and Lu.

Preferably, A and M different from one another are B and/or Mg.

According to one embodiment, each of the decorations (a) and (b) are present in the form of non-overlapping adjacent patterns. For example, each decoration is represented by different geometric patterns uniformly distributed over the entire surface and alternating with one another (see FIG. 10A).

According to another embodiment, the two decorations (a) and (b) are partially overlapping. For example, each decoration is represented by different geometric patterns uniformly distributed over the entire surface and partially overlapping (see FIG. 10B).

Figure 10:
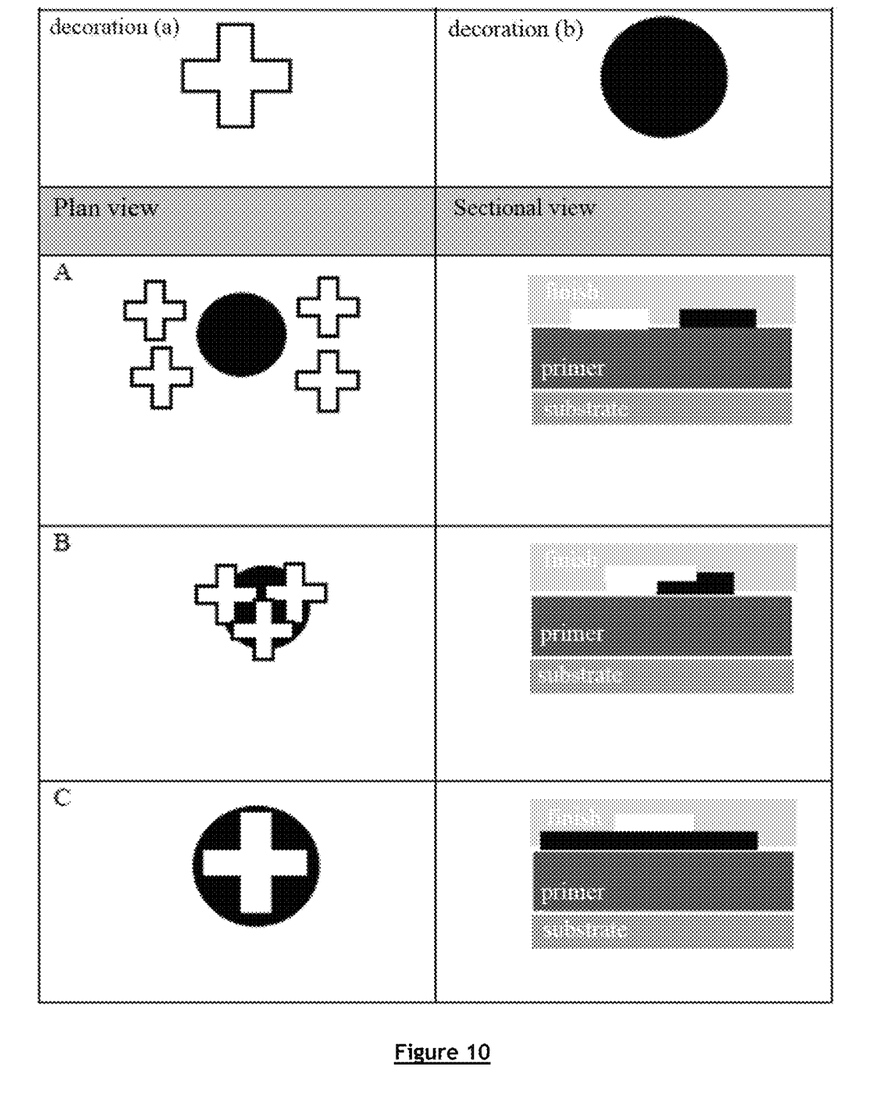
FIG. 10: diagram of the pattern distribution. 10A=non-overlapping adjacent patterns. 10B=partially overlapping patterns. 10C=overlapping patterns.

Preferably, the two decorations (a) and (b) are overlapping, either because one of the two decorations is a continuous coat and the other decoration covers it in the form of patterns, or because the two decorations (a) and (b) are present in the form of two overlapping patterns (see FIG. 10C).

Preferably, the $(Bi_{1-x}A_x)(V_{1-y}M_y)O_4$ pigment exhibits a monoclinic scheelite crystallographic form at room temperature.

Said decorations optionally comprise one or more fluoropolymers.

Said decorations optionally comprise additives. Said additives are chosen in the group consisting of solvents, thickeners, antifoaming agents, pH adjusters, wetting agents and dispersing agents.

Said solvents are preferentially chosen in the group consisting of: water, alcohols, diols, glycols and esters.

Said thickeners are preferentially chosen in the group consisting of acrylic based copolymer or polyurethane based copolymer, cellulose, fumed silica and silicone resin.

Said anti-foaming agents are preferably chosen in the group consisting of polysiloxane, modified polysiloxane, polyether-siloxane copolymer, amphiphilic polymers, silicone and aliphatic mineral oil.

Said pH adjusters are preferably chosen in the group consisting of Bronsted bases: ammonia, amines (triethyl amine, triethanolamine, etc.), hydroxides (sodium hydroxide, potash, etc.), and carbonates.

Said wetting and dispersing agents are preferably chosen in the group consisting of high molecular weight fatty acid derivatives, modified polyether, surfactants and modified polyacrylate.

Preferably, the coating according to the invention comprises one or more finish coats applied over the decoration, preferably consisting of one or more fluoropolymers.

According to a first embodiment, the coating according to the invention comprises one or more primer coats applied onto the substrate. The decorations are then applied onto the last primer coat.

Preferably, the coating according to the invention comprises, in the following order from one of the faces of the substrate of the cookware: two primer coats, the two decorative coats (a) and (b), and a finish coat.

According to a second embodiment, the decorations are directly applied onto the substrate.

The decoration can be applied by any method well known to the skilled person, for example, by screen printing or pad printing.

The fluoropolymer(s) can be present in the form of powder or aqueous dispersion or mixtures thereof.

Advantageously, the fluoropolymer(s) can be chosen in the group comprising polytetrafluoroethylene (PTFE), copolymers of tetrafluoroethylene and perfluoropropyl vinyl ether (PFA), copolymers of tetrafluoroethylene and hexafluoropropene (FEP), polyvinylidene fluoride (PVDF), copolymers of tetrafluoroethylene and polymethyl vinyl ether (MVA), terpolymers of tetrafluoroethylene, polymethyl vinyl ether and fluoroalkyl vinyl ether (TFE/PMVE/FAVE), ethylene tetrafluoroethylene (ETFE) and mixtures thereof.

Advantageously, the fluoropolymer(s) can be chosen from polytetrafluoroethylene (PTFE), copolymers of tetrafluoroethylene and perfluoropropyl vinyl ether (PFA), copolymers of tetrafluoroethylene and hexafluoropropene (FEP), a mixture of PTFE and PFA (PTFE/PFA) and a mixture of PTFE and FEP (PTFE/FEP).

Preferably, the fluoropolymer(s) can represent from 10 to 99% by mass, preferably from 50 to 98% by mass of the total dry mass of the non-stick coating composition.

Preferably, x and y are 0, i.e. the invention relates to the use of bismuth vanadate ($BiVO_4$). Advantageously, a $BiVO_4$ of monoclinic scheelite crystallographic form at room temperature is used.

Bismuth vanadate is an inorganic compound of yellow colour, of formula $BiVO_4$, widely used for its colour properties and for its absence of toxicity. Recorded in the Colour Index International database as Q. I. Pigment Yellow 184, it is especially sold by the companies Heubach (Vanadur®), BASF (Sicopal®), FERRO (Lysopac) or Bruchsaler Farbenfabrik (Brufasol®).

This compound has been the subject of many studies due to its intense colour and to its thermochromism. Many synthesis pathways can be considered for producing $BiVO_4$ nanoparticles, such as sol-gel synthesis, pyrolysis of precursors, hydrothermal and solvothermal syntheses and gas phase deposition. However, hydrothermal synthesis can be complex from the mechanistic viewpoint due to the simultaneous formation of stable and unstable phases in the event of rapid heating in a pressurised autoclave. The abundance of phases and the complexity of the phase diagram of the products obtained by hydrothermal synthesis make it difficult to form and stabilise one or the other of the crystallographic phases.

The second, more commonly used synthesis pathway is a solid phase sintering method. It has the advantage of easily obtaining large-scale powders with a high degree of crystallinity at a low cost. $BiVO_4$ particles can thus be obtained by annealing a mixture of bismuth and vanadium salts via a high-temperature sintering process. The microstructure obtained (particle size, morphology, crystallinity) and optional doping elements may affect the band gap of $BiVO_4$, with as a consequence, a modification of its initial colour and/or thermochromism.

The temperature reference pigment composition can be chosen in the group consisting of:

Titanium rutile yellow pigments,

Yellow pigments derived from bismuth, for example selected from stabilised bismuth vanadates (Py184), Red pigments, for example selected from perylene red or iron oxide, Bismuth oxyhalide orange pigments (PO85),
Bismuth vanadate orange pigments (PO86),
Tin titanium zinc orange pigment (PO82),
Cerium sulfide orange pigment (PO75; PO78),
Chrome antimony titanium yellow-orange rutile pigment (PBr24),
Tin and zinc yellow-orange rutile pigment (Py216),
Zinc tin sulfide niobium oxide yellow-orange pigment (Py227),
Double oxides of tin and niobium yellow-orange pigment, and mixtures thereof.

Advantageously, the coating according to the invention is characterised in that the $\Delta E^*$ of the $(Bi_{1-x}A_x)(V_{1-y}M_y)O_4$ type pigment in said coating is greater than or equal to 11 between room temperature and 150° C., $\Delta E^*$ being defined by the formula CIE1976 in the CIELAB colour space:

$$\Delta E^* = \sqrt{(L_2^* - L_1^*)^2 + (a_2^* - a_1^*)^2 + (b_2^* - b_1^*)^2}$$

$L_1^*$, $a_1^*$ and $b_1^*$ characterising the L*a*b* values of said compound at room temperature $L_2^*$, $a_2^*$ and $b_2^*$ characterising the L*a*b* values of said compound at 150° C.

Preferably, the $(Bi_{1-x}A_x)(V_{1-y}M_y)O_4$ type pigment has a $\Delta E^*$ in said coating between room temperature and 150° C. greater than or equal to 13, in a particularly preferred way, greater than or equal to 15.

Advantageously, the coating according to the invention is characterised in that the $\Delta E^*$ of the $(Bi_{1-x}A_x)(V_{1-y}M_y)O_4$ type pigment in said coating is greater than or equal to 15 between room temperature and 200° C., $\Delta E^*$ being defined by the formula CIE1976 in the CIELAB colour space:

$$\Delta E^* = \sqrt{(L_2^* - L_1^*)^2 + (a_2^* - a_1^*)^2 + (b_2^* - b_1^*)^2}$$

$L_1^*$, $a_1^*$ and $b_1^*$ characterising the L*a*b* values of said compound at room temperature $L_2^*$, $a_2^*$ and $b_2^*$ characterising the L*a*b* values of said compound at 200° C.

Preferably, the $(Bi_{1-x}A_x)(V_{1-y}M_y)O_4$ type pigment has a $\Delta E^*$ in said coating between room temperature and 200° C. greater than 17, in a particularly preferred way, greater than or equal to 20.

Advantageously, the evolution of the colour change $\Delta E^*$ as a function of temperature is linear. Preferably, this linear evolution has a slope comprised from 0.05 to 0.1, preferably greater than or equal to 0.1.

The colour can be measured and characterised by means of a colour classification. This classification is only possible if the colours are defined by numbers and this conversion can be done by means of colour spaces.

"A colour space is a three-dimensional mathematical model representing the set of colours perceptible, usable or reproducible by a human or a device." Numerous spaces exist with their own distribution of colours having precise coordinates (for example: the RGB space, widely used by television systems or the CIELAB space which takes into account the logarithmic response of the eye).

Figure 2:
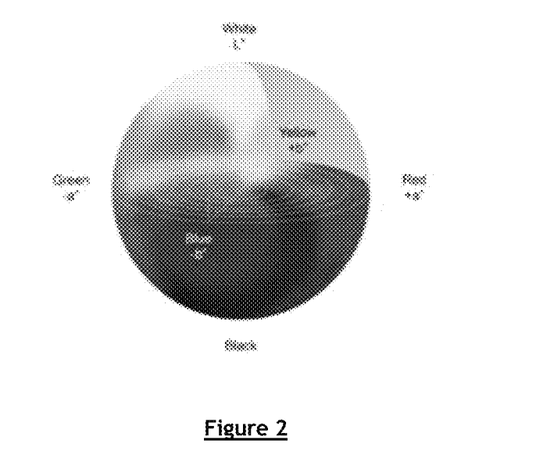
FIG. 2: Focused sphere representing CIELAB space

The CIELAB colour space serves to characterise the colours of different surfaces. This space can be represented according to a geometric model bearing 3 orthogonal axes representing the L*a*b* values (FIG. 2). Each colour thus has clearly specified and unique L*a*b* coordinates:

L* represents the lightness along an axis expressed in percentage, or from black: 0 to white: 100
a* the axis ranging from green: −120 to red: +120
b* the axis ranging from blue: −120 to yellow: +120

These coordinates unique to each colour make it possible to calculate several parameters such as the lightness difference $\Delta L^*$, the hue difference $\Delta H^*$ or the colour difference $\Delta E^*$.

The parameter which interests us in this invention is the colour difference $\Delta E^*$ representing the measurement of the distance between two different colours located in the CIELAB space. The colour difference $\Delta E^*$ does not have a unit.

| | Symbol | CIELAB relation |
|---|---|---|
| Hue angle | h | arctan (b*/a*) |
| Hue angle difference | $\Delta h$ | $\frac{h_2 - h_1}{\sqrt{a^{*2} + b^{*2}}}$ |
| Chroma | C* | |
| Chroma difference | $\Delta C^*$ | $C_2^* - C_1^*$ |
| Lightness difference | $\Delta L^*$ | $L_2^* - L_1^*$ |
| Hue difference | $\Delta H^*$ | $\sqrt{(\Delta E^*)^2 - (\Delta L^*)^2 - (\Delta C^*)^2}$ |
| Colour difference (CIE1976 formula) | $\Delta E^*$ | $\sqrt{(\Delta L^*)^2 + (\Delta a^*)^2 + (\Delta b^*)^2}$ |

Formulas of Deviations and Differences in Hue and Colour

The thermochromism phenomenon is defined as the ability of a compound to change colour as a function of the temperature to which it is subjected.

The $BiVO_4$ compound is yellow at room temperature and changes colour continuously when the temperature increases, passing through orange to red.

$BiVO_4$ is part of the family of semiconductor oxides: this category has a colour mechanism also responsible for their thermochromic properties.

Figure 3:
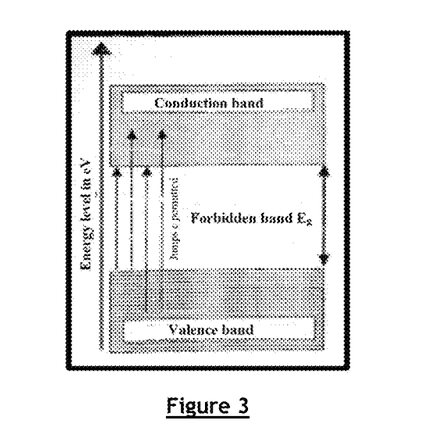
FIG. 3: Diagram illustrating the energy band theory

Indeed, semiconductor materials are characterised by an energy band theory representing the interactions of atoms. It is a model in which the core electrons are assumed to be localised on the atom to which they belong and are thus present in discrete atomic orbitals and therefore do not appear on the energy bands of the model. The valence electrons, on the other hand, are able to be delocalised throughout the crystalline network of the solid; they constitute the valence band. The conduction band is the first empty energy band which can be occupied by the free electrons. The valence band and the conduction band are separated by a forbidden band whose width (also called "gap") is equal to the energy difference present between the energy levels associated with the valence and conduction bands (FIG. 3).

Figure 4:
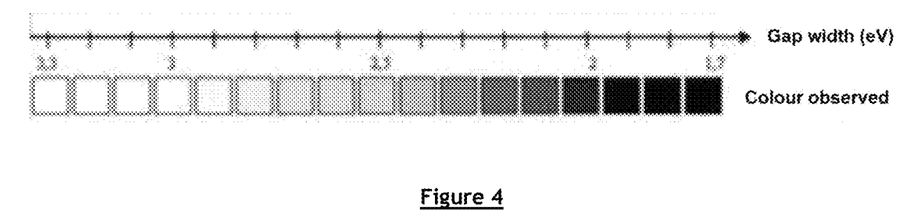
FIG. 4: Diagram illustrating the connection between the forbidden band (or gap) and the colour observed
Figure 5:
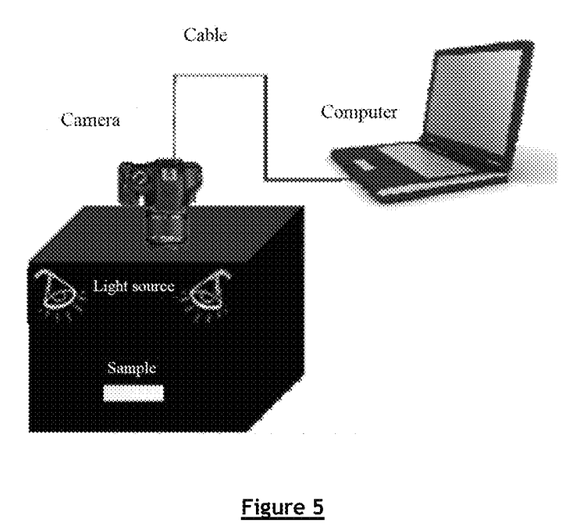
FIG. 5: General diagram of computer vision method
Figure 6:
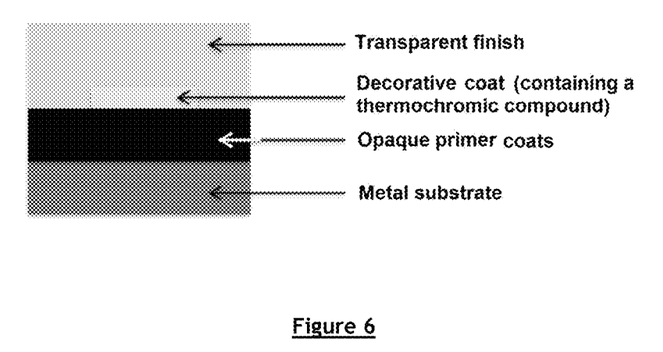
FIG. 6: Production of a coating integrating a temperature indicator

The colour of semiconductor materials is related to the width of the forbidden band which separates the valence bands and the conduction bands of the material in question. It is the electronic transitions of energy equal to or greater than the width of the forbidden band which are responsible for the colour of the material. The width of a forbidden band ranging from 1.7 eV to 3 eV can create colours ranging from black to white through a colour palette extending to colours ranging from light yellow to red, thus passing through oranges (red corresponding to low energies and light yellow to high energies). (FIG. 4)

Under the influence of temperature, the interatomic anion-cation bonds expand, causing a decrease in the orbital overlap. This results in a drop of the covalence of the bonds and therefore a reduction of the gap; the transfer of electrons is then facilitated between the valence band and the conduction band between two atoms.

The semiconductor materials are therefore thermochromic due to the size change of their crystalline structure under the influence of a temperature increase. If the crystalline structure changes, the interactions within the network are not the same; the width of the forbidden band will then vary and, as a consequence, the colour changes.

The majority of semiconductor materials when they are subjected to a temperature increase, have a reduction of the width of their forbidden band. This explains the colour change of $BiVO_4$, yellow at room temperature, to red when it is heated.

Another subject-matter of the invention concerns a household article comprising a substrate, preferably metal, completely or partially covered with a coating according to the invention.

The colour change of the $(Bi_{1-x}A_x)(V_{1-y}M_y)O_4$ type pigment allows the user to be notified, on the one hand, that the article is hot and therefore presents a risk of burns and, on the other hand, that the surface of the article has reached the appropriate temperature for its use.

Advantageously, the article support can be plastic, metal, glass, ceramic or terracotta. Metal supports usable in the context of the present invention advantageously include supports of aluminium or aluminium alloy, anodised or not, or of polished, sandblasted, chemically treated aluminium or aluminium alloy, or polished, brushed or bead-blasted stainless steel, or cast iron or aluminium, or titanium or hammered or polished copper.

Examples of household articles usable in the context of the present invention can notably include deep fryer bowls, fondue or raclette pans or pots, the bowl of a deep fryer or bread machine, the jar of a blender, the plates of a straightening iron and the iron soleplates.

For a better adhesion of the coating, the surface of the support can be treated so as to increase its specific surface, for example by sandblasting, brushing or chemical treatment; for aluminium, this treatment can be done by anodization (creation of a tubular alumina structure), by chemical etching, by sandblasting, etc. The other metal substrates can also be polished, sandblasted, brushed or bead-blasted.

The primer coat(s) can comprise a bonding resin, especially when the substrate is mechanically treated.

Preferably, the bonding resin(s) is (are) chosen in the group consisting of polyamide imides (PAI), polyether imides (PEI), polyamides (PA), polyimides (PI), polyetherketones (PEK), polyetheretherketones (PEEK), polyaryletherketones (PAEK), polyethersulfones (PES) and polyphenylene sulfide (PPS), polybenzimidazoles (PBI) and tannins.

Advantageously, the article according to the invention is a cookware and the coating according to the invention completely or partially covers the substrate on the face receiving the food.

Advantageously, the article according to the invention is a hair straightener and the coating according to the invention completely or partially covers its plates.

Advantageously, the article according to the invention is a clothing iron and the coating according to the invention completely or partially covers its soleplate.

Advantageously, the article is a cookware of which one of the faces of the support is a concave inner face intended to be in contact with the food placed inside said cookware and the other support face of the cookware is a convex outer face intended to be in contact with a heat source.

Preferably, said household article is an article of cookware, preferably chosen in the group consisting of saucepan, frying pan, stew pot, wok, sauté pan, crepe maker, grill, plancha grill, raclette grill, marmite pot or casserole dish, and said coating is intended to come into contact with food.

In the fields of application considered for the present invention, an article to be heated of the cookware type or a heating article of the iron type is typically used in a range of temperatures comprised from 10° C. to 300° C.

Another subject-matter of the invention relates to a method of using a household article according to the invention, characterised by the following steps:

Heating said household article or putting it in the presence of an external heating source, Observing the colour change(s) of the $(Bi_{1-x}A_x)(V_{1-y}M_y)O_4$ type pigment and the temperature reference pigment composition, Using said household article when:
  the colours of the $(Bi_{1-x}A_x)(V_{1-y}M_y)O_4$ pigment and the temperature reference pigment composition are identical, or
  the colours of the $(Bi_{1-x}A_x)(V_{1-y}M_y)O_4$ pigment and the temperature reference pigment composition, respectively, reach the colours defined in the instructions for use of said household article.

The coating according to the invention comprises at least two pigments including $(Bi_{1-x}A_x)(V_{1-y}M_y)O_4$ type pigment and the temperature reference pigment composition.

The optimal conditions of use can be reached when their colours are visually identical to the naked eye for the user at the standard distance for use of the article according to the invention. If we take one example, the coating according to the invention can comprise $BiVO_4$ which changes from yellow to orange between room temperature and the optimal use temperature, and orange thermostable bismuth oxyhalide.

The usage instructions may indicate to the user the colours at which he may begin to use the household article according to the invention under optimal conditions. This indication will be present, for example, in the form of geometric patterns filled with ad hoc colours or a gradient colour bar (see, for example, in FIG. 4). This pattern or this bar serves as a comparative reference to the user who can bring it close to the coated surface of the article according to the invention.

Preferably, in the case of cookware, the optimal conditions are attained when the coating reaches a temperature suitable for cooking food, preferably comprised between 100 and 250° C.

EXAMPLES OF EMBODIMENT

Example 1: Pigment Selection

The pigments used are inorganic compound powders:
Thermochromic pigments:
  $BiVO_4$, process described in Example 2, batches 2b and 2d
  $Bi_2O_3$, Varistor Fine grade, sold by the company 5N Plus
  Sicopal® Yellow K1120FG pigment, sold by the company BASF
  Bayferrox® 130 pigment, sold by the company Bayferrox
Thermostable pigments (temperature reference pigments):
  Yellow 10C242 pigment, sold by the Shepherd Color Company
  Yellow 6716B pigment, sold by the company FERRO
These compounds may be used singly or in mixture.

Example 2: Process for Synthesising a $BiVO_4$ Pigment Compound According to the Invention Process 2.1

To a solution of bismuth nitrate (0.1 M) in 1 M nitric acid is added stoichiometrically a solution of ammonium vanadate (0.1 M) in 1 M nitric acid. The mixture is stirred overnight, filtered, washed with water and then dried. The powder is then annealed at 450° C. for 3 hours.

The bismuth vanadate is then obtained in the form of a bright yellow powder of monoclinic scheelite structure characterised by X-ray diffraction analysis.

The process takes place at pH<1 with no addition of alkaline agent.

Process 2.2

To a solution of bismuth nitrate (0.4 M) in 1 M nitric acid is added a stoichiometric quantity of sodium metavanadate in the powder form. The mixture is stirred for 2 hours at 80° C. The precipitate is then filtered and washed with water to obtain a yellow $BiVO_4$ powder in the monoclinic scheelite form. The powder is then annealed at 500° C. for 3 hours. The process takes place at pH<1 with no addition of alkaline agent.

The monoclinic scheelite $BiVO_4$ thus has a $\Delta E=40$ between room temperature and 200° C.

Example 3: Integration of the Compounds into a Black Fluorinated Non-Stick Coating In order to offer the consumer a cookware with an inner non-stick coating provided with a decoration guiding him during its cooking, compounds with improved thermochromic properties are introduced into a non-stick coating having several coats:

The primer coat(s), of opaque colour,
The thermochromic compound integrated into a decorative coat,
The translucent finish coat(s).

i. Preparation of Two Primer Coats

A first formulation based on an aqueous PTFE dispersion is prepared.

(a) Primer 1/Formula 1a

| Component | weight % wet formula | weight % dry film |
|---|---|---|
| fluorinated polymer aqueous dispersion | 24 | 60 |
| carbon black aqueous dispersion | 4 | 4 |
| colloidal silica | 16 | 20 |
| bonding resin solvent dispersion | 41 | 16 |
| additives (base, wetting agents, etc.) | 6 | — |
| water | 9 | — |

A second formulation based on an aqueous PTFE dispersion is prepared.

(b) Primer 2/Formula 2a

| Component | weight % wet formula | weight % dry film |
|---|---|---|
| fluorinated polymer aqueous dispersion | 48 | 88 |
| carbon black aqueous dispersion | 5 | 4 |
| colloidal silica | 3 | 3 |
| bonding resin solvent dispersion | 19 | 5 |
| additives (base, wetting agents, etc.) | 12 | — |
| water | 13 | — |

Formulations 1a and 2a are filtered before being applied with an air spray gun onto the inside of a preformed aluminium cap. This support is at least degreased and dedusted beforehand. For a better adhesion of the coating, the support surface is treated by sandblasting so as to increase its specific surface.

The primer is applied in at least one coat of 5 to 50 microns thick. In the case of an application in several coats, each coat is dried before application of the next one.

ii. Preparation of a Thermochromic Decoration

A pad printing paste containing a thermochromic pigment such as described in Example 1 is prepared according to the formulation described below.

| PTFE 5035Z | PTFE dispersion | 58.06 |
|---|---|---|
| pigment | Thermochromic | 27.42 |
| SD15 | Thickener | 1.89 |
| WATER | | 2.13 |
| AMMONIA | pH adjuster | 0.48 |
| PPG | Solvent | 9.72 |
| K7 | Antifoaming agent | 0.30 |
| Total | | 100.00 |

This paste is applied in the form of patterns by pad printing on the dried primer coat.

iii. Preparation of a Thermostable Reference Decoration

A pad printing paste containing a thermostable reference pigment such as described in Example 1 is prepared according to the formulation described below.

| PTFE 5035Z | PTFE dispersion | 59.06 |
|---|---|---|
| Pigment | Thermostable | 23.62 |
| SD15 | Thickener | 2.19 |
| WATER | | 3.13 |
| AMMONIA | pH adjuster | 0.48 |
| PPG | Solvent | 11.22 |
| K7 | Antifoaming agent | 0.30 |
| Total | | 100.00 |

This paste is applied in the form of a pattern onto the dried thermochromic decoration.

iv. Preparation of the Finish Coat and Curing

The finish coat is produced in the same way as the primer coat, the only difference being that it must remain transparent, so it does not comprise pigments, but optionally glitter.

| Component | % wt wet formula | % wt dry film |
|---|---|---|
| fluorinated polymer aqueous dispersion | 93 | 99 |
| glitter | 1 | 1 |
| additives (base, wetting agents, etc.) | 3 | — |
| ethylene glycol | 2 | — |
| water | 1 | — |

Once all the coats are applied and dried, the article is cured at 430° C. for 11 min.

Example 4: Method for Characterising Sample Colours

A light booth consisting of a closed enclosure equipped with controlled lighting is used. A camera is directly installed above the booth and is connected to a photo processing software making it possible to obtain the colour-related characteristics of the samples analysed. The light booth is lit with a D50 illuminant (corresponding to daylight).

The principle of this characterisation is to position the material to be analysed in the booth, to take a photo of it and to extract colour data from the photo using appropriate software.

By means of the L*a*b* values obtained, a colour difference (or colour variation) ΔE* is obtained at each temperature relative to the reference temperature (RT=25° C.) for a given sample, ΔE* being defined by the formula CIE1976 in the CIELAB colour space:

$$\Delta E^* = \sqrt{(L_2^*-L_1^*)^2 + (a_2^*-a_1^*)^2 + (b_2^*-b_1^*)^2}$$

with:
$L_1^*, a_1^*, b_1^*$: coordinates of the pigment colour at the standard temperature (25° C. or RT) or of the reference pigment.
$L_2^*, a_2^*, b_2^*$: coordinates of the pigment colour at a chosen temperature (25° C./100° C./150° C./180° C./200° C./250° C.) or of the chosen pigment.

Figure 7:
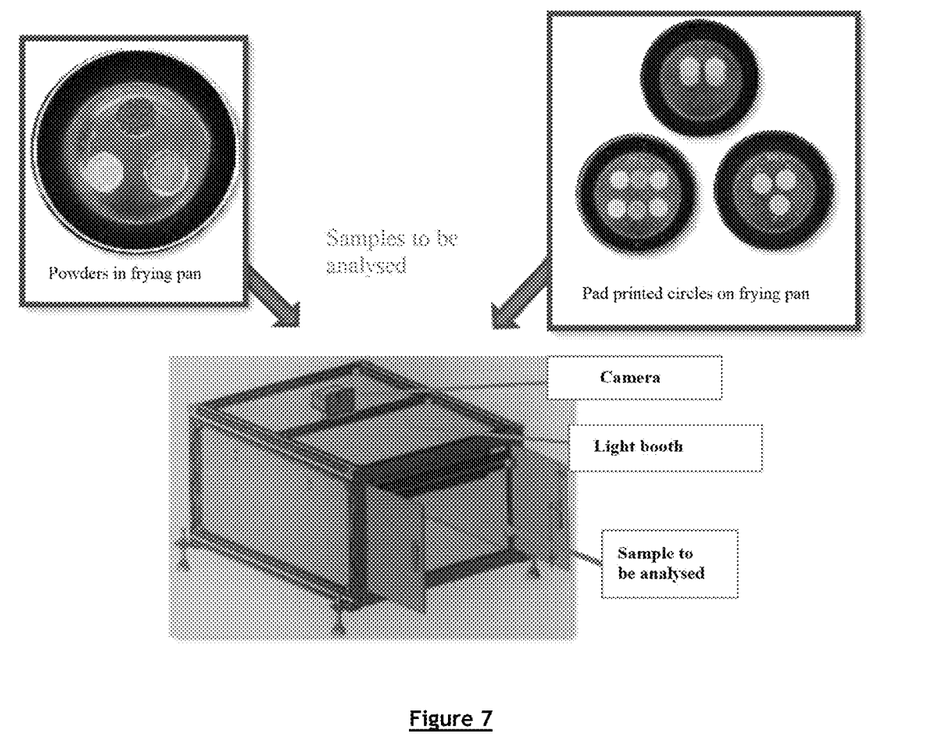
FIG. 7: Diagram illustrating the different types of samples and light booth installation+camera

The protocols described below have been developed and make it possible to control at best the following elements: no possible heating directly in the booth (so as not to disrupt the atmosphere and the camera) but taking photo at a target temperature, using timing of the transfer phases.

i. Equipment
Thermometer with contact sensor
Stopwatch
Hotplate
Photo light booth
CANON EOS 13000D camera (Canon 28-mm wide-angle lens)
Glass slides
Data acquisition softwares: Capture One and Photoshop ii. Protocol for Samples in the Form of Pad-Printed Decoration on a Frying Pan (FIG. 7)
Measure the necessary time to move the frying pan containing the pad stamped pigment circles from the hotplate to the booth, close the booth, activate the camera. (t=15 sec).
Heat and stabilise the sample around the target temperature.
Test the temperature which at the end of 15 sec adjusts to the desired temperature.
Perform a simulation 3 times with this temperature to confirm or adjust depending on the sample temperature obtained after 15 sec.
Initiate the acquisition.
Perform the characterisation by selecting the photo surface to be analysed using the software and then read the L*a*b* values.
The Capture One software is used for the image capture in RAW format, which can subsequently be converted into any other file format.
The Photoshop software used then allows the raw file to be converted (conversion to TIFF format). It then makes it possible to perform the conversion of an RGB colour space to a CIE L*a*b* colour space with a D50 illuminant.

iii. Protocol for Samples in the Form of Powder (FIG. 7)
Make 3 separate heaps of different powders in a frying pan (about a teaspoon).
Flatten the powder heaps with a glass plate in order to have smooth, homogenous surfaces with the same thicknesses.
Then, perform the same protocol as previously.

Example 5: Exploitation of Results i. Calculations of the ΔE* of a Sample at Several Temperatures Take, for the example, the pigment $Fe_2O_3$ in the powder form.
The L*a*b* coordinates and ΔE* results for $Fe_2O_3$ for each temperature appear below:

| | Lens T ° C. | | | | | | | | | |
|---|---|---|---|---|---|---|---|---|---|---|
| | Room temperature = 25° C. | | | 100° C. | | | | 150° C. | | |
| Coordinates | L* | a* | b* | L* | a* | b* | ΔE* (RT) | L* | a* | b* | ΔE* (RT) |
| $Fe_2O_3$ | 35.9 | 34.2 | 23.1 | 32.5 | 30.4 | 18.8 | 6.7 | 29.2 | 26.4 | 15.5 | 12.8 |

| | Lens T ° C. | | | | | | | | |
|---|---|---|---|---|---|---|---|---|---|
| | 180° C. | | | | 200° C. | | | | 250° C. | | | |
| Coordinates | L* | a* | b* | ΔE* (RT) | L* | a* | b* | ΔE* (RT) | L* | a* | b* | ΔE* (RT) |
| $Fe_2O_3$ | 30.0 | 25.4 | 14.6 | 13.5 | 30.0 | 24.2 | 13.9 | 14.8 | 28.7 | 21.9 | 12.2 | 18.0 |

Example at 100° C.:

$$\Delta E^*_{100°C.} = \sqrt{(L_{100}^*-L_{25}^*)^2 + (a_{100}^*-a_{25}^*)^2 + (b_{100}^*-b_{25}^*)^2}$$

$$\Delta E^*_{100°C.} = \sqrt{(32.5-35.9)^2 + (30.4-34.2)^2 + (18.8-23.1)^2} = 6.7104$$

| ΔE* values calculated for each sample at given temperatures | | | | | | | |
|---|---|---|---|---|---|---|---|
| Powders | T ° C. | 25 | 100 | 150 | 180 | 200 | 250 |
| $BiVO_4$ 2d | ΔE* (RT) | 0 | 14.3 | 31.4 | 39.2 | 43.6 | 59.5 |
| $BiVO_4$ 2b | | 0 | 21.2 | 37 | 41.8 | 45.2 | 53.4 |
| $Bi_2O_3$ | | 0 | 18.3 | 30 | 37 | 42.1 | 52.2 |
| Sicopal Yellow K1120FG | | 0 | 12.6 | 19.9 | 20.9 | 19.1 | 23.6 |
| Bayferrox 130 | | 0 | 6.7 | 12.8 | 13.5 | 14.8 | 18 |
| Yellow 10C242 | | 0 | 1.7 | 3.2 | 3.6 | 5.3 | 6.4 |
| Yellow 6716B | | 0 | 1.7 | 3.9 | 4.3 | 5.6 | 6.7 |
| Frying pans with pad printed decoration | T ° C. | 25 | 100 | 150 | 180 | 200 | 250 |
| $BiVO_4$ 2d | ΔE* (RT) | 0 | 9 | 17.6 | 22.8 | 25.4 | 34.9 |
| $BiVO_4$ 2b | | 0 | 9 | 15.6 | 20.8 | 23.4 | 32.1 |
| Bayferrox 130 | | 0 | 6.1 | 9.4 | 12 | 14.1 | 18.4 |
| Yellow 10C242 | | 0 | 1.7 | 2.3 | 2.8 | 3.2 | 4.2 | ii. Graphic Interpretations
The ΔE* values calculated for each sample at different temperatures make it possible to visualise by means of graphs (ΔE*=f (Temperature ° C.)) the evolution of the colour difference relative to the colour at room temperature.

The graph (FIG. 8) shows the colour variations of each pigment in the powder form.

Figure 8:
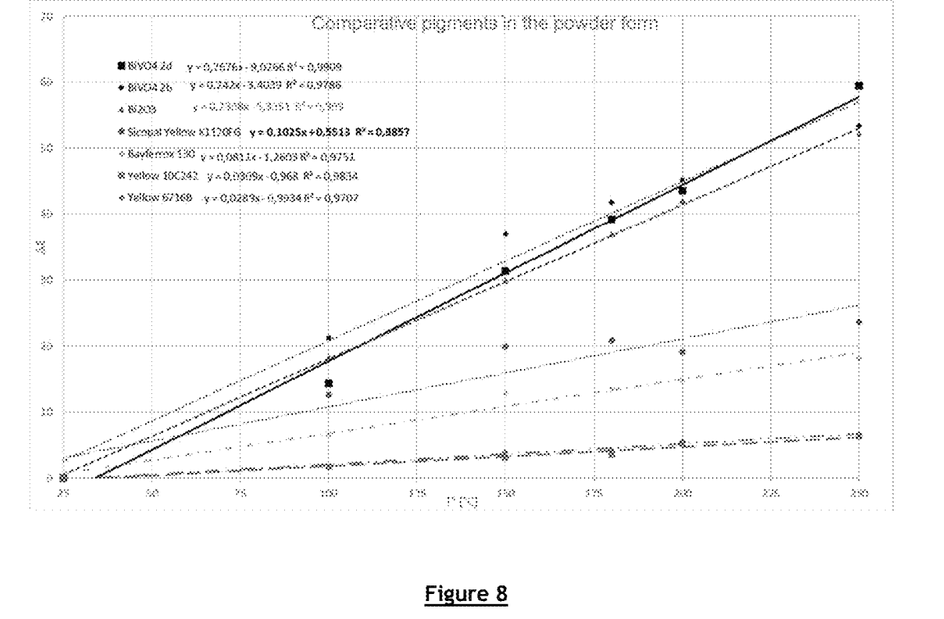
FIG. 8: Comparison of pigments in the form of powders

The pigments studied in this case all have a fairly linear colour change as a function of temperature.

The "very good" thermochromic pigments have a colour difference $\Delta E^*$ between 25° C. and 200° C. greater than or equal to 40 and a linear change in the colour difference $\Delta E^*$ as a function of temperature with a slope greater than or equal to 0.2.

The "good" thermochromic pigments have a colour difference $\Delta E^*$ between 25° C. and 200° C. comprised from 30 to 40 and a linear change in the colour difference $\Delta E^*$ as a function of temperature with a slope greater than or equal to 0.2.

The "average" thermochromic pigments have a colour difference $\Delta E^*$ between 25° C. and 200° C. comprised from 10 to 30 and a linear change in the colour difference $\Delta E^*$ as a function of temperature with a slope comprised from 0.05 to 0.2.

The thermostable pigments have a colour difference $\Delta E^*$ between 25° C. and 200° C. less than 10 and a linear change in the colour difference $\Delta E^*$ as a function of temperature with a slope less than 0.05.

The graph (FIG. 9) shows the colour variations of each pigment in the form of pad printed decoration in a non-stick coating such as previously described.

Figure 9:
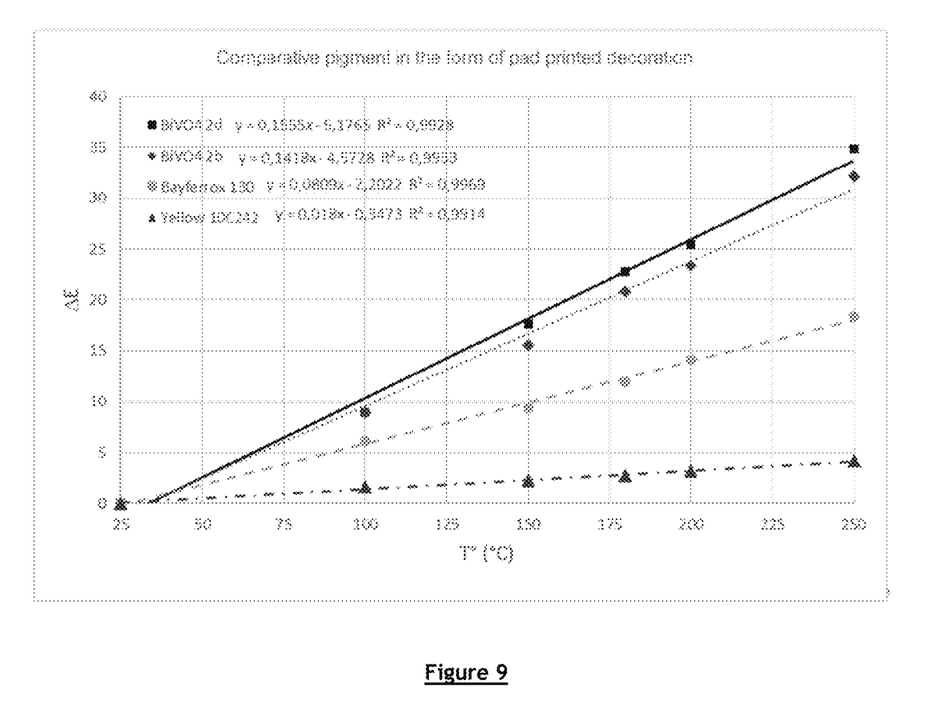
FIG. 9: Comparison of pigments in the form of pad-printed decoration on a frying pan

The coloured materials integrated into a non-stick coating studied in this case all have a fairly linear colour change as a function of temperature.

The colour change behaviours as a function of temperature and the classification of the compounds with respect to each other are very similar to the observations made with the materials in powder form. However, a clear reduction in the colour differences is observed, related to the integration in the non-stick coating and most probably related to the "filter" effect of the finish coat which is not perfectly transparent.

The "very good" thermochromic pigments integrated into a non-stick coating have a colour difference $\Delta E^*$ between 25° C. and 200° C. greater than or equal to 20 and a linear change in the colour difference $\Delta E^*$ as a function of temperature with a slope greater than or equal The "good" thermochromic pigments integrated into a non-stick coating have a colour difference $\Delta E^*$ between 25° C. and 200° C. comprised between 15 and 20 and a linear change in the colour difference $\Delta E^*$ as a function of temperature with a slope greater than or equal to 0.1.

The "average" thermochromic pigments integrated into a non-stick coating have a colour difference $\Delta E^*$ between 25° C. and 200° C. comprised between 7 and 15 and a linear change in the colour difference $\Delta E^*$ as a function of temperature with a slope comprised from 0.05 to 0.1.

The thermostable pigments integrated into a non-stick coating have a colour difference $\Delta E^*$ between 25° C. and 200° C. less than or equal to 7 and a linear change in the colour difference $\Delta E^*$ as a function of temperature with a slope less than or equal to 0.05.

The invention claimed is:

1. A household article comprising a substrate, completely or partially covered with a coating comprising one or more primer coats comprising a fluoropolymer applied onto the substrate and at least two decorations (a) and (b) arranged on said primer coats:
   (a) a decoration comprising at least a thermochromic pigment composition in the form of particles consisting of a $(Bi_{1-x}A_x)(V_{1-y}M_y)O_4$ type pigment in which
       x is equal to 0 or x is between 0.001 and 0.999,
       y is equal to 0 or y is between 0.001 and 0.999,
       A and M are chosen in the group consisting of nitrogen, phosphorus, an alkali metal, an alkaline earth metal, a transition metal, a poor metal, a metalloid or a lanthanide,
       A and M are different from one another,
   (b) a decoration comprising a temperature reference pigment composition;
   wherein the $\Delta E^*$ of the $(Bi_{1-x}A_x)(V_{1-y}M_y)O_4$ pigment in said coating is greater than or equal to 11 between room temperature and 150° C., $\Delta E^*$ being defined by the formula CIE1976 in the CIELAB colour space:

$$\Delta E^* = \sqrt{(L_2^* - L_1^*)^2 + (a_2^* - a_1^*)^2 + (b_2^* - b_1^*)^2}$$

$L_{1*}$, $a_1^*$ and $b_1^*$ values characterising the $L^*a^*b^*$ values of said compound at room temperature
   $L_{2*}$, $a_2^*$ and $b_2^*$ values characterising the $L^*a^*b^*$ values of said compound at 150° C.

2. The household article according to claim 1, wherein the household article is a cookware and in that the coating completely or partially covers the face of the household article receiving the food.

3. The household article according to claim 1, wherein the household article is a clothing iron and in that the coating completely or partially covers the soleplate of said clothing iron.

4. The household article according to claim 1, wherein the household article is a hair straightener and in that the coating completely or partially covers the plates of said hair straightener.

5. A method of using a household article according to claim 1, comprising the following steps:
   Heating said household article or putting it in the presence of an external heating source,
   Observing the colour change(s) of the $(Bi_{1-x}A_x)(V_{1-y}M_y)O_4$ type pigment and the temperature reference pigment composition,
   Using said household article when:
       the colours of the $(Bi_{1-x}A_x)(V_{1-y}M_y)O_4$ pigment and the temperature reference pigment composition are identical, or
       the colours of the $(Bi_{1-x}A_x)(V_{1-y}M_y)O_4$ pigment and the temperature reference pigment composition, respectively, reach the colours defined in the instructions for use of said household article.

6. The household article according to claim 1, where x and y equal 0.

7. The household article according to claim 1, wherein each of the two decorations (a) and (b) are present in the form of non-overlapping adjacent patterns.

8. The household article according to claim 1, wherein the two decorations (a) and (b) are partially overlapping.

9. The household article according to claim 1, wherein the $\Delta E^*$ of said $(Bi_{1-x}A_x)(V_{1-y}M_y)O_4$ pigment in said coating is greater than or equal to 15 between room temperature and 200° C., $\Delta E^*$ being defined by the formula CIE1976 in the CIELAB colour space:

$$\Delta E^* = \sqrt{(L_2^* - L_1^*)^2 + (a_2^* - a_1^*)^2 + (b_2^* - b_1^*)^2}$$

$L_1^*$, $a_1^*$ and $b_1^*$ values characterising the $L^*a^*b^*$ values of said compound at room temperature
   $L_2^*$, $a_2^*$ and $b_2^*$ values characterising the $L^*a^*b^*$ values of said compound at 200° C.

10. The household article according to claim 1, wherein the amount of $(Bi_{1-x}A_x)(V_{1-y}M_y)O_4$ in the decorative coat (a) is comprised from 0.1 to 100% by weight relative to the weight of said coat in the dry state.

11. The household article according to claim 1, wherein said coating comprises one or more finish coats applied over said decorations.

12. The household article according to claim 1, wherein the decorations are applied by screen printing or pad printing.

13. The household article according to claim 1, wherein the $(Bi_{1-x} A_x) (V_{1-y} M_y) O_4$ pigment exhibits a monoclinic scheelite crystallographic form at room temperature.

14. The household article according to claim 1, wherein A and/or M is an alkali metal chosen from Li, Na, K, Rb and Cs, A and M being different from one another, and/or A and/or M is an alkaline earth metal chosen from Be, Mg, Ca, Sr and Ba, A and M being different from one another, and/or A and/or M is a transition metal chosen from Sc, Ti, Cr, Mn, Fe, Co, Ni, Cu, Y, Zr, Nb, Mo, Ru, Rh, Pd, Ag, Ta, W and Ir, A and M being different from one another, and/or A and/or M is a poor metal chosen from Al, Zn, Ga, In and Sn, A and M being different from one another, and/or A and/or M is a metalloid chosen from B, Si, Ge and Sb, A and M being different from one another, and/or A and/or M is a lanthanide chosen from La, Ce, Pr, Nd, Pm, Sm, Eu, Gd, Tb, Dy, Ho, Er, Tm, Yb and Lu, A and M being different from one another.

15. The household article according to claim 1, wherein said coating comprises, in the following order from one of the faces of the substrate: two primer coats, the two decorative coats (a) and (b) and a finish coat.

16. The household article according to claim 1, wherein the fluoropolymer(s) is (are) chosen in the group comprising polytetrafluoroethylene (PTFE), copolymers of tetrafluoroethylene and perfluoro propyl vinyl ether (PFA), copolymers of tetrafluoroethylene and hexafluoropropene (FEP), polyvinylidene fluoride (PVDF), copolymers of tetrafluoroethylene and poly methyl vinyl ether (MVA), terpolymers of tetrafluoroethylene, poly methyl vinyl ether and fluoroalkyl vinyl ether (TFE/PMVE/FAVE), ethylene tetrafluoroethylene (ETFE) and mixtures thereof.

* * * * *